(12) United States Patent
Teramachi et al.

(10) Patent No.: US 7,832,300 B2
(45) Date of Patent: Nov. 16, 2010

(54) ROLLER SCREW

(75) Inventors: Akihiro Teramachi, Shinagawa-ku (JP); Hidekazu Michioka, Shinagawa-ku (JP); Hiroshi Niwa, Shinagawa-ku (JP); Kentaro Nishimura, Shinagawa-ku (JP)

(73) Assignee: THK Co., Ltd., Tokyo (JP)

( * ) Notice: Subject to any disclaimer, the term of this patent is extended or adjusted under 35 U.S.C. 154(b) by 531 days.

(21) Appl. No.: 10/571,112

(22) PCT Filed: Sep. 2, 2004

(86) PCT No.: PCT/JP2004/012748

§ 371 (c)(1),
(2), (4) Date: Mar. 8, 2006

(87) PCT Pub. No.: WO2005/026581

PCT Pub. Date: Mar. 24, 2005

(65) Prior Publication Data

US 2006/0248973 A1    Nov. 9, 2006

(30) Foreign Application Priority Data

Sep. 10, 2003    (JP) ............................ 2003-319032
Sep. 10, 2003    (JP) ............................ 2003-319033

(51) Int. Cl.
*F16H 25/22*    (2006.01)
(52) U.S. Cl. ............... 74/424.87; 74/424.82; 74/424.86
(58) Field of Classification Search . 74/424.81–424.88; 384/44, 55, 564
See application file for complete search history.

(56) References Cited

U.S. PATENT DOCUMENTS 3,055,230 A * 9/1962 Strassberg ............... 74/424.82

(Continued)

FOREIGN PATENT DOCUMENTS

JP    11-62962    3/1999

(Continued)

OTHER PUBLICATIONS

International Search Report dated Dec. 14, 2004 of PCT/JP2004/012748.

*Primary Examiner*—Richard W Ridley
*Assistant Examiner*—Thomas Diaz
(74) *Attorney, Agent, or Firm*—Westerman, Hattori, Daniels & Adrian, LLP

(57) ABSTRACT

There is provided a roller screw comprising a screw shaft 1 having an outer peripheral surface in which a spiral roller rolling groove 1*a* is formed, a nut member 2 having an inner peripheral surface in which a spiral loaded roller rolling groove 2*a* is formed so as to oppose to the roller rolling groove of the screw shaft, a return pipe 4 in which a roller return passage 5 is formed so as to connect one and another ends of a loaded roller rolling passage 3 between the roller rolling groove 1*a* of the screw shaft 1 and the loaded roller rolling groove 2*a* of the nut member 2, a number of rollers 6 disposed in the loaded roller rolling passage 3 and the roller return passage 5, wherein the roller return passage 5 is twisted so that an attitude of the roller 6 changes as the roller moves in an axial direction of the return pipe 4. Such roller screw enables to provide an easy assembling and compact structure and to realize smooth circulation of the roller.

3 Claims, 13 Drawing Sheets

U.S. PATENT DOCUMENTS

| | | | |
|---|---|---|---|
| 3,192,791 A * | 7/1965 | Greby | 74/424.82 |
| 4,750,378 A * | 6/1988 | Sheppard | 74/424.87 |
| 6,978,693 B2 * | 12/2005 | Ohkubo | 74/424.87 |
| 2001/0017062 A1 * | 8/2001 | Nishimura et al. | 74/424.81 |
| 2001/0038724 A1 * | 11/2001 | Murata | 384/44 |
| 2003/0172759 A1 * | 9/2003 | Hayashi | 74/424.86 |

FOREIGN PATENT DOCUMENTS

| | | |
|---|---|---|
| JP | 11-210858 | 8/1999 |
| JP | 2001-263445 | 9/2001 |

* cited by examiner

FIG. 17
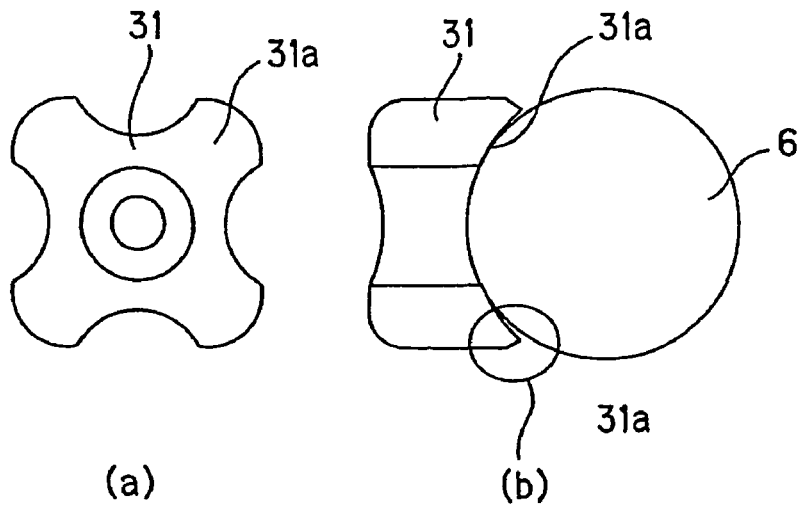
(a)  (b)
FIG. 18
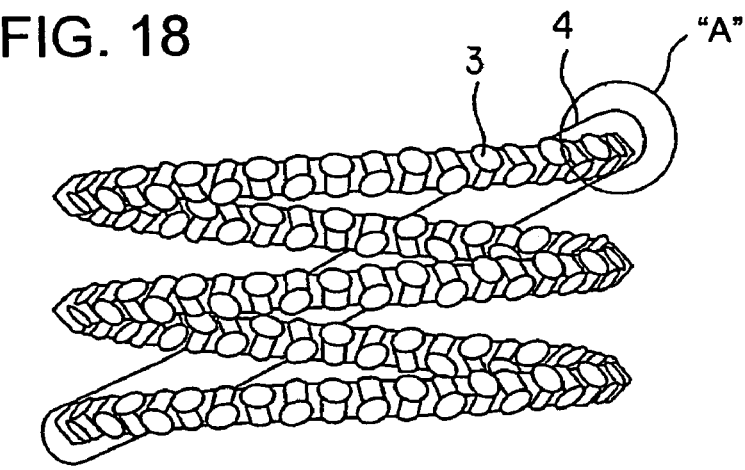
FIG. 19   enlarged view of "A"
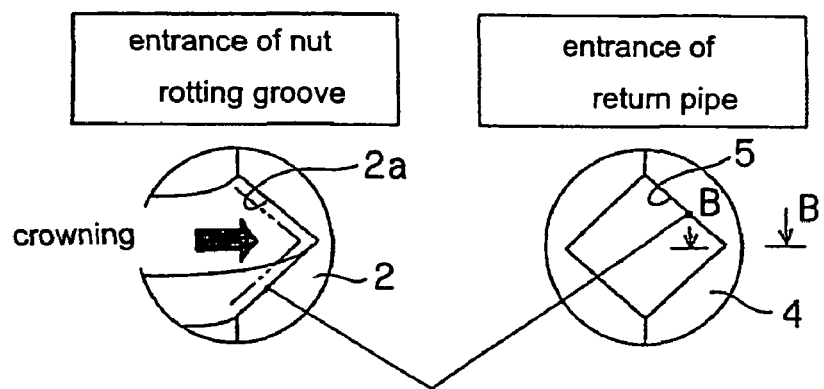

enlarged view of B-B line

US 7,832,300 B2

ROLLER SCREW

TECHNICAL FIELD

The present invention relates to a roller screw in which rollers are disposed to be capable of carrying out a rolling motion between a screw shaft and a nut member.

BACKGROUND TECHNOLOGY

A ball screw in which balls are disposed to be capable of carrying out a rolling motion between the screw shaft and the nut member contributes to reduce a coefficient of friction when the screw shaft rotates with respect to the nut member, in comparison with a screw performing a sliding contact with no ball interposed, so that such ball screw has actually been used for a positioning mechanism or feed mechanism of a machine tool or a steering gear of an automobile.

In the ball screw, a number of balls are interposed between a ball rolling groove, in form of spiral, formed on an outer peripheral surface of the screw shaft and a loaded ball rolling groove, in form of spiral, formed on an inner peripheral surface of the nut member. When the screw shaft is rotated relatively to the nut member, a number of balls roll on the ball rolling groove of the screw shaft and the loaded ball rolling groove of the nut member. The ball rolling to one end of the loaded ball rolling groove of the nut member is scooped up by a return pipe in which a ball return passage is formed so as to connect one end of the loaded ball rolling groove and the other one end thereof and then to return the ball to the original position of the loaded ball rolling groove, thus the balls circulating.

In these days, roller screws utilizing rollers in place of balls have been provided. Although the ball rolls in every direction, the roller has a limit in its rolling direction. Because of this reason, a circulation passage of the roller screw may have a complicated structure.

In a Patent Publication 1, it is disclosed that a roller circulation passage, having a rectangular shape in section, for circulating the roller is formed by connecting one and the other ends of the spiral groove of the nut member, and this roller circulation passage is composed of linear roller scoop-up portions communicated with both ends of a roller rolling portion of the spiral groove of the nut member and a roller circulation portion communicated with these roller scoop-up portions. The roller scoop-up portion is composed of a split circulator member. The roller circulation portion for communicating the roller scoop-up portions is constructed by assembling a return plate, to which a circulation groove, having V-shaped section, is formed, to the outer peripheral surface of the nut member having a circulation groove having V-shaped section. The roller scoop-up portion serves to spirally guide the roller so that the rolling attitude of the roller changes between the spiral groove and the roller circulation portion of the nut member. The roller circulation portion serves to linearly guide the roller from one scoop-up portion to another scoop-up portion without changing its rolling attitude.

Patent Publication 1: Japanese Patent Laid-open Publication No. HEI 11-210858.

DISCLOSURE OF THE INVENTION

Problems to be Solved by the Invention

A ball screw using balls as rolling members has been commercially sold. However, a roller screw using rollers as rolling members has not been commercially sold though it has been proposed as in the patent publication 1. It seems that this is caused because of engagement of the rollers with the scoop-up portions at the time of scooping up the rollers from the loaded roller rolling groove of the nut member or complicated structure of the circulation passage giving a complicated motion to the rollers.

In addition, although the ball can roll in every direction, the roller has a limit in its rolling direction. This limitation may be caused by one of reasons such that the roller is engaged or jammed with a connecting or jointing portion between the loaded roller rolling groove to the roller return passage at a time of scooping up the roller from the loaded roller rolling groove of the nut member to the roller return passage or a time of returning roller from the roller returning passage to the loaded roller rolling groove.

Then, the present invention aims to provide a roller screw capable of being easily assembled and having a simple structure and in which the rollers can smoothly circulate.

Furthermore, the present invention aims to provide a roller screw capable of smoothly circulating the roller at the joining portion between the loaded roller rolling groove to the roller returning passage.

Means for Solving the Problem

Hereunder, the present invention is explained. Further, it is to be noted that reference numerals on the drawings are added with parentheses ( ) for the sake of easy understanding to the invention, but the present invention is not limited to the modes described on the drawings.

In order to solve the above problem, the first aspect of this disclosure is characterized by a roller screw comprising a screw shaft (1) having an outer peripheral surface in which a spiral roller rolling groove (1a) is formed, a nut member (2) having an inner peripheral surface in which a spiral loaded roller rolling groove (2a) is formed so as to oppose to the roller rolling groove (1a) of the screw shaft (1), a return pipe (4) in which a roller return passage (5) is formed so as to connect one and another ends of a loaded roller rolling passage (3) between the roller rolling groove (1a) of the screw shaft (1) and the loaded roller rolling groove (2a) of the nut member (2), a number of rollers (6) disposed in the loaded roller rolling passage (3) and the roller return passage (5), wherein the roller return passage (5) is twisted so that an attitude of the roller (6) changes as the roller moves in an axial direction of the return pipe (4).

The second aspect of this disclosure is characterized, in the roller screw of the first aspect, in that the roller (6) bearing a load from one direction ((1)) in the axial direction of the screw shaft (1) is reversed so as to bear a load from a direction ((2)) reverse to the one direction ((1)) by passing the return pipe (4).

The third aspect of this disclosure is characterized, in the roller screw of the first or second aspect, in that the return pipe (4) includes a central portion (14) extending linearly and a pair of end portions (15, 15) bent at both sides of the central portion (14), and the roller return passage (5) is twisted in the central portion (14) of the return pipe (4).

The fourth aspect of this disclosure is characterized, in the roller screw of the third aspect, in that the roller return passage (5) in the central portion (14) of the return pipe (4) is twisted at an equal angle from a center of the central portion (14) in the axial direction toward the paired end portions (15, 15) of the return pipe (4).

The fifth aspect of this disclosure is characterized, in the roller screw of any one of the first to fourth aspects, in that the return pipe (4) is divided along the axial direction thereof, each of divided pieces (23a, 23b) has a groove (26, 27) constituting the roller return passage (5), the groove (26, 27) having one wall surface (26a, 27a) inclining with respect to another wall surface (26a', 27a') thereof in the twisted section of the roller return passage (5), and the roller (6) is guided between a wall surface (26a') of one of the divided pieces (23a) of the roller and a wall surface (27a') of the other one of the divided pieces (23b) opposing to the wall surface (26a') of the one of the divided pieces (23a).

The sixth aspect of this disclosure is characterized, in the roller screw of any one of the first to fifth aspects, in that the return pipe (4) has a central portion (14) and a pair of end portions (15, 15) bent at both sides of the central portion (14), and front ends of the paired end portions (15, 15) at which the roller return passage (5) having a rectangular section corresponding to a side surface of the roller (6) are disposed in a tangential direction of the loaded roller rolling passage (3) as viewed from the axial direction of the screw shaft (1) and inclined in a lead angle direction of the loaded roller rolling passage (3) as viewed from the side of the screw shaft (1).

The seventh aspect of this disclosure solves the above problem by providing a roller screw comprising a screw shaft (1) having an outer peripheral surface in which a spiral roller rolling groove (1a) is formed, a nut member (2) having an inner peripheral surface in which a spiral loaded roller rolling groove (2a) is formed so as to oppose to the roller rolling groove (1a) of the screw shaft (1), a circulation member (4) in which a roller return passage (5) connected to the loaded roller rolling passage (3) is formed so that rollers (6) rolling in the loaded roller rolling passage (3) between the roller rolling groove (1a) of the screw shaft (1) and the loaded roller rolling groove (2a) of the nut member (2) circulate, and a number of rollers (6) disposed in the loaded roller rolling passage (3) and the roller return passage (5), wherein the circulation member (4) has a front end (15b) in which a notch (18) is formed so as to prevent the circulation member (4) from contacting to the screw thread of the screw shaft (1), a roller guide portion (19) is formed inside the notch (18) so as to intrude inside the screw thread as viewed from the axial direction of the screw shaft (1), the roller return passage (5) has a rectangular section at a position of the roller guide portion (19).

The eighth aspect of this disclosure is characterized, in the roller screw of the seventh aspect, in that the roller guide portion (19) along the axial direction of the roller return passage (5) has a sectional shape tapered so as to be gradually reduced in a width toward the front end (20) of the roller guide portion (19).

The ninth aspect of this disclosure solves the problem mentioned above by providing a roller screw comprising a screw shaft (1) having an outer peripheral surface in which a spiral roller rolling groove (1a) is formed, a nut member (2) having an inner peripheral surface in which a spiral loaded roller rolling groove (2a) is formed so as to oppose to the roller rolling groove (1a) of the screw shaft (1), a circulation member (4) in which a roller return passage (5) connected to the loaded roller rolling passage (3) is formed so that rollers (6) rolling in the loaded roller rolling passage (3) between the roller rolling groove (1a) of the screw shaft (1) and the loaded roller rolling groove (2a) of the nut member (2) circulate, and a number of rollers (6) disposed in the loaded roller rolling passage (3) and the roller return passage (5), wherein the circulation member (4) has a front end (15b) at which the roller return passage (5) having a rectangular section corresponding to a side surface shape of the roller (6) is formed, and the loaded roller rolling groove (2a) of the nut member (2) is formed so that a shape of the loaded roller rolling groove (2a) of the nut member (2) and a shape of the roller return passage (5) at the front end (15b) accord with each other at the joining portion between the loaded roller rolling passage (3) and the front end (15b) of the circulation member (4).

The tenth aspect of this disclosure solves the problem mentioned above by providing a roller screw comprising a screw shaft (1) having an outer peripheral surface in which a spiral roller rolling groove (1a) is formed, a nut member (2) having an inner peripheral surface in which a spiral loaded roller rolling groove (2a) is formed so as to oppose to the roller rolling groove (1a) of the screw shaft (1), a circulation member (4) in which a roller return passage (5) connected to the loaded roller rolling passage (3) is formed so that rollers (6) rolling in the loaded roller rolling passage (3) between the roller rolling groove (1a) of the screw shaft (1) and the loaded roller rolling groove (2a) of the nut member (2) circulate, and a number of rollers (6) disposed in the loaded roller rolling passage (3) and the roller return passage (5), wherein the circulation member (4) has a front end (15b) at which the roller return passage (5) having a rectangular section corresponding to a side surface shape of the roller (6) is formed, and the front end (15b) of the circulation member (4) is disposed in a tangential direction of the loaded roller rolling passage (3) as viewed from the axial direction of the screw shaft (1) and inclined in a lead angle direction of the loaded roller rolling passage (3) as viewed from the side of the screw shaft (1).

EFFECT OF THE INVENTION

According to the first aspect, at a time when the roller is scooped up in the return pipe from the loaded roller rolling passage and when the roller returns to the loaded roller rolling passage from the return pipe, the roller can be scooped up in conformity with the attitude of the roller rolling in the loaded roller rolling passage having the rectangular section. Accordingly, the rollers can be smoothly circulated. In addition, the rollers are circulated only by the return pipe connecting one and another ends of the loaded roller rolling passage, so that the roller screw can be easily assembled and can provide a compact structure.

The return pipe serves to return the roller to the roller rolling passage on succeeding several turns. As in the second aspect, the twisting angle of the roller return passage can be made minimal by reversing and returning the roller bearing the load in one direction so as to bear the load in the reverse direction.

At the end of the return pipe, since the roller is scooped up, there is a fear that the roller is not smoothly scooped up if the attitude of the roller changes at the end. According to the third aspect, since the roller attitude is changed at the central portion of the return pipe apart from the roller scooped-up portion, the above problem can be solved.

According to the fourth aspect, the attitude of the roller can be equally changed at both the side portions of the return pipe with the central position in the axial direction of the central portion being the center thereof.

The return pipe may be formed through a resin molding. According to the fifth aspect, an undercut is not caused by forming the groove constituting the twisted roller return passage to the divided pieces of the return pipe. In such structure, since the roller is guided between the wall surface of one divided piece and the wall surface of the other divided piece opposing to the aforementioned wall surface, the roller attitude can be surely controlled in the roller return passage.

In comparison with the annular roller rolling passage such as cross roller ring, in the loaded roller rolling passage of the roller screw, the roller rolls in the state inclined by an amount of the lead angle. According to the sixth aspect, by inclining the attitude of the roller by the amount of the lead angle and returning the roller from the return pipe to the loaded roller rolling passage, the roller can be smoothly returned to the loaded roller rolling passage without changing its attitude at the time of entering into the loaded roller rolling passage from the return pipe (without causing inclination, so-called skewing, of the roller axis). In addition, the roller can be also smoothly returned in the return pipe from the loaded roller rolling passage.

According to the seventh aspect, by providing the roller guide portion at the front end of the circulation member, the sectional shapes of the loaded roller rolling passage and the roller return passage can be made continuous, and accordingly, the roller can be smoothly circulated at the joining portion between the loaded roller rolling passage and the roller return passage.

According to the eighth aspect, the space between the loaded roller rolling groove and the roller guide portion, at which the roller return passage having the rectangular section is not formed, can be made small, and accordingly, the sectional shape of the loaded roller rolling passage and the sectional shape of the roller return passage can be made continuous.

The roller return passage can be formed so as to have a diameter slightly larger than that of the loaded roller rolling passage. According to the ninth aspect, the shapes of the loaded roller rolling groove of the nut member and the front end of the circulation member accord with each other, so that any step is not caused at the joining portion between the loaded roller rolling passage to the roller return passage. In addition, the stress at the time of the entrance of the roller into the loaded roller rolling groove from the circulation member can be relaxed.

In comparison with the circular roller rolling passage such as cross roller ring, the roller rolls in the state inclined by the amount of the lead angle in the loaded roller rolling passage of the roller screw. According to the tenth aspect, by inclining the attitude of the roller by the amount of the lead angle and returning the roller from the circulation member to the loaded roller rolling passage, the roller can be smoothly returned to the loaded roller rolling passage without changing its attitude at the time of entering into the loaded roller rolling passage from the circulation member (without causing inclination, so-called skewing, of the roller axis). In addition, the roller can be also smoothly returned in the circulation member from the loaded roller rolling passage.

According to the invention of claim 7, by providing the roller guide portion at the front end of the circulation member, the sectional shapes of the loaded roller rolling passage and the roller return passage can be made continuous, and accordingly, the roller can be smoothly circulated at the joining portion between the loaded roller rolling passage and the roller return passage.

According to the invention of claim 8, the space between the loaded roller rolling groove and the roller guide portion, at which the roller return passage having the rectangular section is not formed, can be made small, and accordingly, the sectional shape of the loaded roller rolling passage and the sectional shape of the roller return passage can be made continuous.

The roller return passage can be formed so as to have a diameter slightly larger than that of the loaded roller rolling passage. According to the invention of claim 9, the shapes of the loaded roller rolling groove of the nut member and the front end of the circulation member accord with each other, so that any step is not caused at the joining portion between the loaded roller rolling passage to the roller return passage. In addition, the stress at the time of the entrance of the roller into the loaded roller rolling groove from the circulation member can be relaxed.

In comparison with the circular roller rolling passage such as cross roller ring, the roller rolls in the state inclined by the amount of the lead angle in the loaded roller rolling passage of the roller screw. According to the invention of claim 10, by inclining the attitude of the roller by the amount of the lead angle and returning the roller from the circulation member to the loaded roller rolling passage, the roller can be smoothly returned to the loaded roller rolling passage without changing its attitude at the time of entering into the loaded roller rolling passage from the circulation member (without causing inclination, so-called skewing, of the roller axis). In addition, the roller can be also smoothly returned in the circulation member from the loaded roller rolling passage.

BRIEF DESCRIPTION OF THE DRAWINGS

FIG. 17 shows a spacer disposed between the rollers.

FIG. 18 is a plan view showing a joining portion between the loaded roller rolling groove and the return pipe.

FIG. 19 is an enlarged view of a portion A in FIG. 18.

EXPLANATION OF REFERENCE NUMERALS

1 - - - nut member, 1a - - - roller rolling groove, 2 - - - nut member, 2a - - - loaded roller rolling groove, 3 - - - loaded roller rolling groove, 4 - - - return pipe, 5 - - - roller returning passage, 6 - - - roller, 14 - - - central portion, 15 - - - end portion, 15b - - - front end, 18 - - - notch, 19 - - - roller guide portion, 20 - - - front end of roller guide portion, 23a, 23b - - - divided piece (split member), 26, 27 - - - groove, 26a', 27a' - - - wall surface

BEST MODE FOR EMBODYING THE INVENTION

Figure 1:
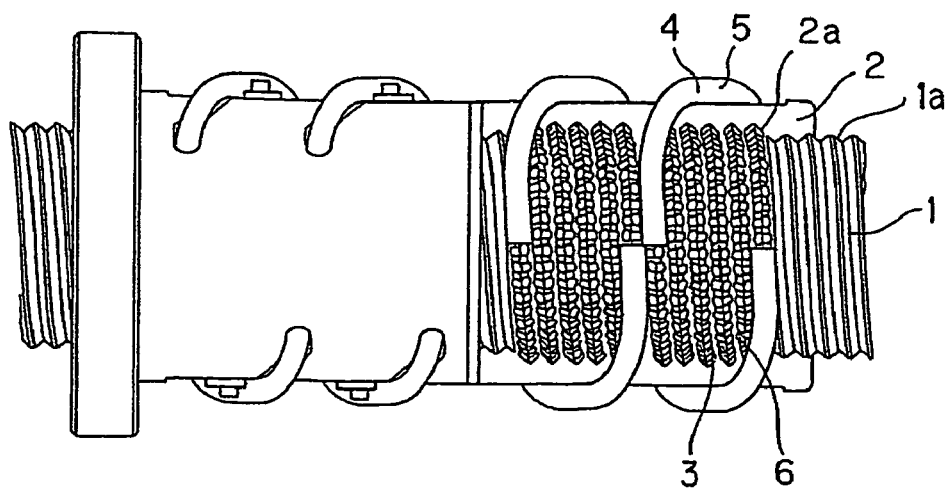
FIG. 1 is a side view showing a roller screw according to one embodiment of the present invention.

FIG. 1 shows a roller screw according to one embodiment of the present invention. The roller screw includes a screw shaft 1 formed, in its outer peripheral surface, with a roller rolling groove 1a in form of spiral and a nut member 2 formed, in its inner peripheral surface, with a loaded roller rolling groove, in form of spiral, assembled with the screw shaft 1 to be relatively rotatable. The nut member 2 is provided with a return pipe 4 as a circulation member connecting one and the other ends of a loaded roller rolling groove 3 between the roller rolling groove 1a of the screw shaft 1 and the loaded roller rolling groove 2a of the nut member 2. Inside the return pipe, there is formed a roller return passage 5, having a rectangular section such as square shape in this embodiment, along the axial direction of the return pipe. A number of rollers 6 are accommodated and arranged in the loaded roller rolling passage 3 formed by the roller rolling groove 1a of the screw shaft 1 and the loaded roller rolling groove 2a of the nut member 2 and in the roller returning passage 5 formed inside the return pipe 4. According to the relative rotation of the screw shaft 1 with respect to the nut member 2, the nut member 2 moves linearly relative to the screw shaft 1 in the axial direction thereof. In this moment, the roller 6 rolls between the roller rolling groove 1a and the loaded roller rolling groove 2a. The roller rolling to one end of the loaded roller rolling groove 2a, is guided to the roller returning passage 5 in the return pipe 4 and then returned to the other end of the loaded roller rolling groove 2a on the succeeding several turns of spiral. The rollers 6 are thereby circulate in the roller circulation passage constituted by the loaded roller rolling passage 3 and the roller returning passage 5.

Figure 2:
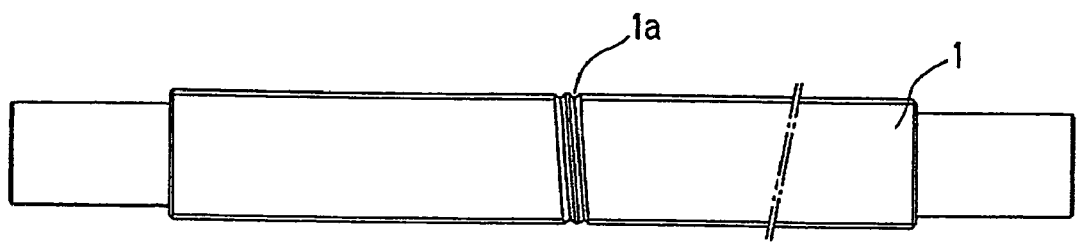
FIG. 2 is a side view showing a screw shaft.

FIG. 2 shows the screw shaft 1. The spiral roller rolling groove having a predetermined lead is formed in the outer peripheral surface of the screw shaft 1. The roller rolling groove 1a has a V-shaped section with an opening angle of 90 degrees. As a screw, a single threaded screw, double threaded screw, triple threaded screw or other various type screws may be utilized, and in this embodiment, double threaded screw is utilized.

Figure 3:
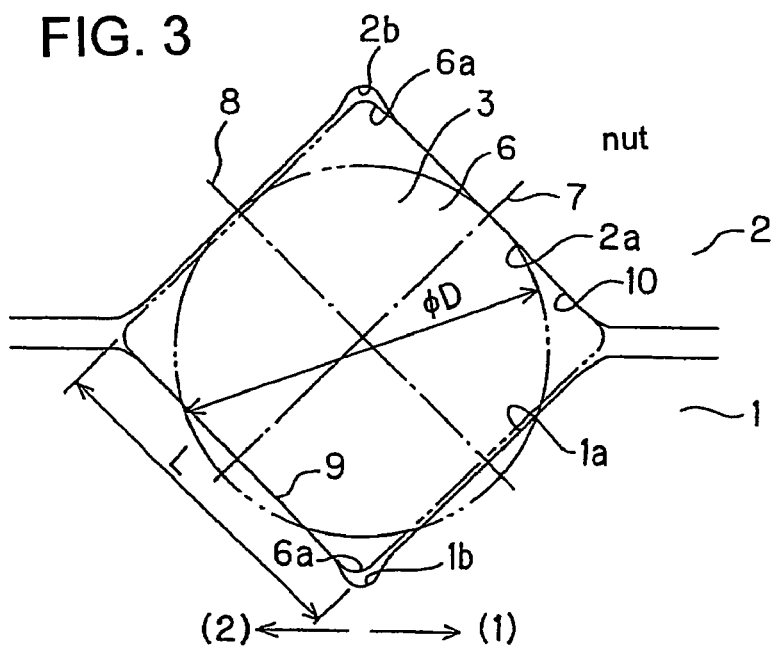
FIG. 3 is a detailed sectional view showing a roller rolling groove and a loaded roller rolling groove.

FIG. 3 shows a detailed view of the roller rolling groove 1a of the screw shaft 1 and the loaded roller rolling groove 2a of the nut member 2. The nut member 2 is formed with the spiral loaded roller rolling groove 2a opposing to the roller rolling groove 1a. The loaded roller rolling groove 2a also has a V-shaped section with an opening angle of 90 degrees. The loaded roller rolling passage 3, having a rectangular section, such as square section in this embodiment, is formed by the roller rolling groove 1a and the loaded roller rolling groove 2a. In the loaded roller rolling passage 3, a number of rollers 6 are arranged in form of cross-shape so that rotation axes 7 and 8 of the adjacent rollers 6 are perpendicular to each other as viewed along the loaded roller rolling passage 3.

In the ball screw, the balls bear the loads in one direction in the axial direction of the screw shaft and another direction opposing to that one direction. On the other hand, the rollers bear the load by compressing its peripheral surface between one wall surface of the roller rolling groove 1a and one wall surface of the loaded roller rolling groove 2a opposing to the wall surface of the roller rolling groove, so that the load only in one direction of the axial directions of the screw shaft 1 is born. By arranging, in form of cross-shape, the rollers 6 as in the present embodiment, the rollers 6 can bear the loads in one (1) and another (2) directions in the axial directions of the screw shaft 1. The rollers 6 bearing the load in one direction (1) in the axial direction of the screw shaft 1 are called α group and, on the other hand, the rollers 6 bearing the load in the other direction (2) are called β group.

The roller 6 has a diameter D longer than a length L thereof in the axial direction. There is used a roller 6 having a diameter D larger, so-called over-size, than a distance between a wall surface 9 of the roller rolling groove 1a and a wall surface 10 of the loaded roller rolling groove 2a opposing to the wall surface 9. Because of this reason, the roller is elastically deformed in the loaded roller rolling passage 3, and a load corresponding to this deformation exists inside the nut member 2 as pre-load. Since the rollers 6 are arranged in cross-shape in the loaded roller rolling passage 3, the loads applied to the nut member 2 from the rollers 6 act in repulsing directions to each other for the adjacent rollers 6, 6. In an initial stage, a pre-load A is applied to the respective rollers 6, and the loads are balanced in the vertical and horizontal directions. Supposing that an axial load P is applied to the nut member 2 from this state, and then, the nut member 2 is displaced in the axial direction by an amount δ. In such case, the load of each of the rollers 6 of the α group is increased by the load B and becomes A+B, and on the other hand, the load of each of the rollers 6 of the β group is reduced by a load C and becomes A−C.

Figure 4:
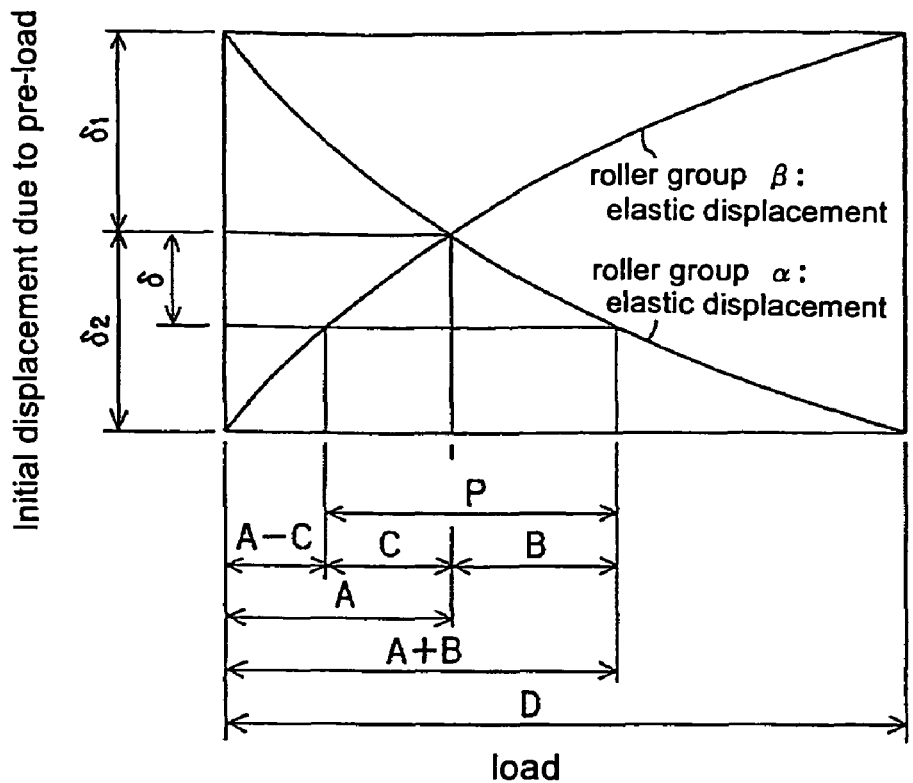
FIG. 4 is a graph representing a relationship in displacement caused by a load and a pre-load.

FIG. 4 shows this relationship further in detail. Since the over-sized rollers 6 are inserted so as to apply the pre-load, the α group rollers 6 are elastically displaced by δ 1 and the β group rollers 6 are elastically displaced by δ 2, and a load caused at that time corresponds to the pre-load A. When the axial load P is then applied thereto to thereby cause the axial displacement of δ, the displacement increases along the elastic displacement diagram in the α group rollers 6, and on the other hand, the displacement decreases along the elastic displacement diagram in the β group rollers 6. Thus, the load A+B is applied to the α group rollers and the load A−C is applied to the β group rollers. Accordingly, the load P is divided into the loads B and C, which act to the α group rollers and the β group rollers with the directions being changed. Even if this state be changed, the inner load should not be changed, so that this matter is expressed simply as follows.

$$(A+B)-(A-C)-P=0$$

$$\therefore B+C=P$$

The reason why the rigidity increases by applying the pre-load resides in the increasing of the number of rollers receiving the load, and hence, the reduction of the load to be applied to each roller. In a use of a roller having a diameter smaller than a prescribed diameter and applied with no pre-load, only one of the α group rollers and the β group rollers receives the load. However, by applying the pre-load, both the α group rollers and the β group rollers receive the load, so that the number of the rollers to which the load is applied is made twice. According to this reason, it becomes possible to effectively use the rollers 6 existing in the nut member 2 with respect to the acting external force and to distribute the load so that the rollers which essentially do not receive the load become to receive the load.

As shown in FIG. 3, escape grooves 1b and 2b are further formed to the bottom portions of the roller rolling groove 1a of the screw shaft 1 and the loaded roller rolling grooves 2a along these grooves. To the intersection portions between the upper surface and peripheral surface of the roller 6 and between the bottom surface and peripheral surface thereof, there are formed round portions 6a. Since the dimension L of the roller 6 in the axial direction is smaller than the diameter D of the roller 6, there may cause a case that the roller 6 is displaced during its rolling motion and the round portions 6a of the roller 6 contact the escape groove 1b and 2b. By applying the pre-load to the roller 6, this displacement will easily be caused. Radius of a round portion of the escape groove 1b (2b) is set to be larger than radius of the round portion of the roller so as not to disturb the rotating of the roller by a resistance caused at the time of the displacement. In addition, by forming the escape grooves 1b and 2b, it is not necessary to cut the sharp front end of the V-groove, so that the workability in the cutting operation can be also improved.

Figure 5:
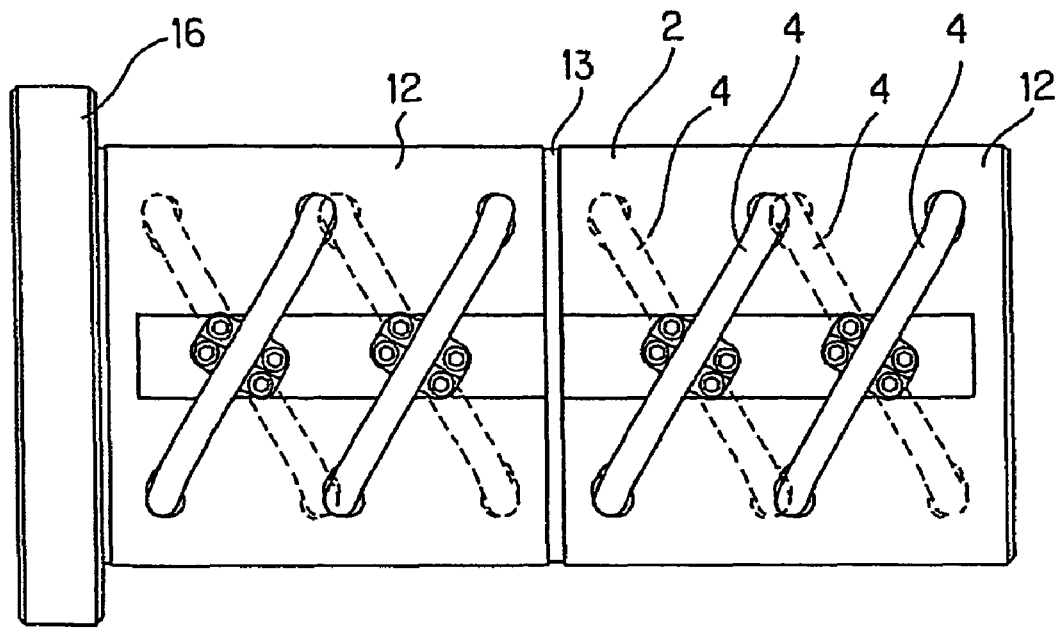
FIG. 5 is a plan view showing a nut member.
Figure 6:
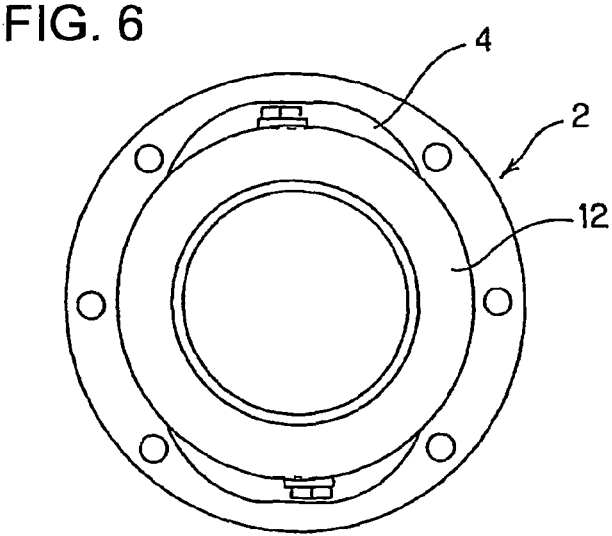
FIG. 6 is a front view showing the nut member.
Figure 7:
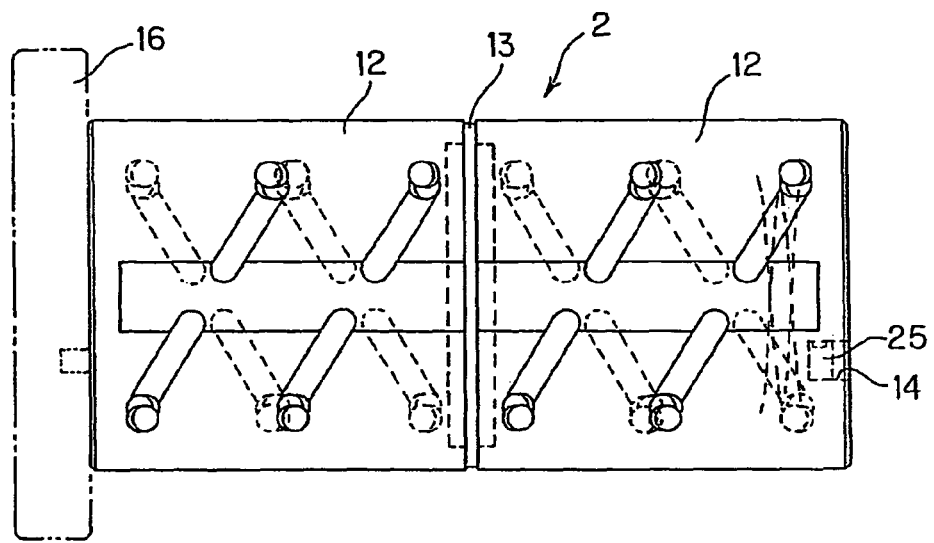
FIG. 7 is a plan view of the nut member with a return pipe being removed.
Figure 8:
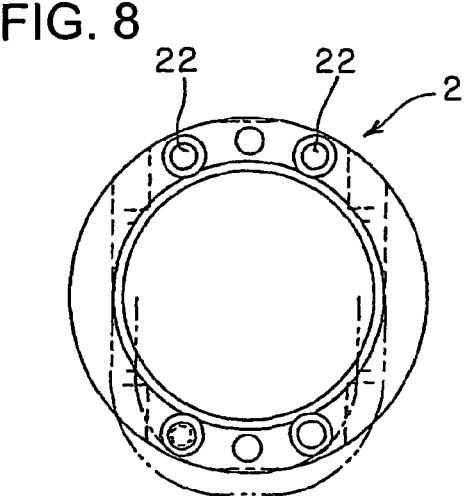
FIG. 8 is a front view showing the nut member with a return pipe being removed.

FIGS. 5 and 6 show the nut member 2, and FIGS. 7 and 8 also show the nut member 2 with the return pipe 4 being removed. FIGS. 5 and 7 are plan views of the nut member, and FIGS. 6 and 8 are front views of the nut member 2 viewed from the axial direction of the screw shaft 1. The nut member 2 is, as shown in FIG. 5, divided into two separate nut pieces 12, 12 between which a shim 13 is disposed. The shim 13 is disposed not so as to apply the pre-load to the roller 6 but to easily manufacture the roller 6. In a case of the nut member 2 having a long length in the axial direction, it becomes difficult to work a lead with high precision. The lead is formed to each of the separate nut pieces 12, 12 and these two nut pieces are combined thereafter by means of the shim 13. A bolt 25 is inserted into bolt insertion holes 22 formed to these separate nut pieces 12, 12 in their axial directions, and these separate nut pieces 12, 12 are combined by the screw-engagement of the nut member 2 with a flange 16 of an objective member to which the nut 2 is mounted so as to snapping the nut pieces 12, 12. In this operation, the shim 13 serves to position, in the circumferential direction, the two separate nut pieces 12, 12 when these nut pieces are displaced form each other in the circumferential direction. If the insertion holes 22 of these nut pieces 12, 12 are positioned when the end faces of the two nut pieces 12, 12 facing each other are mated, it is not necessary to dispose the shim 13. Further, the bolt insertion hole 22 has a diameter larger than the diameter of the bolt 25, it is also not necessary to dispose the shim 13.

Figure 9:
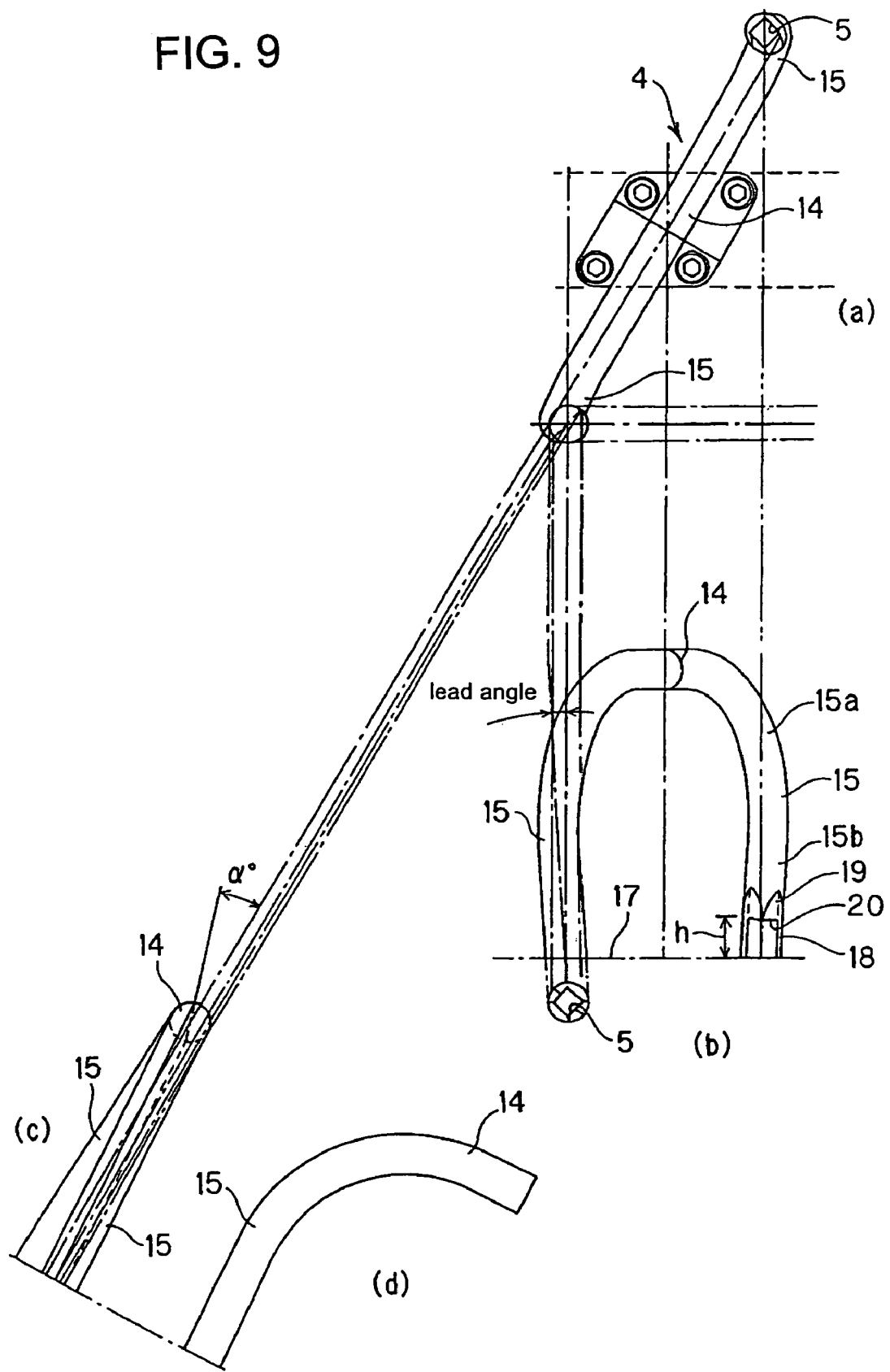
FIG. 9 is a view showing the return pipe.
Figure 10:
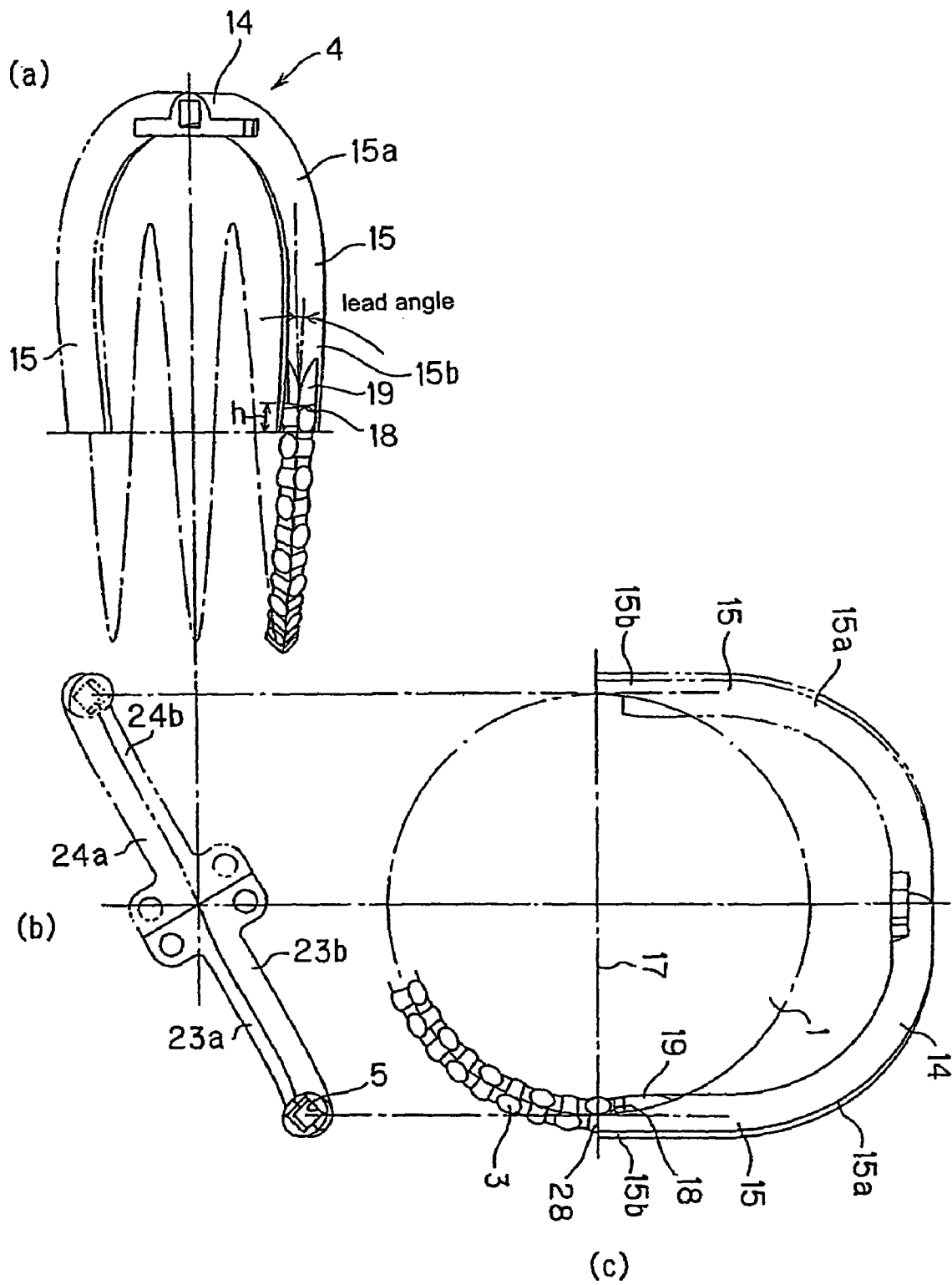
FIG. 10 is a view showing the return pipe.

FIGS. 9 and 10 show the return pipe 4 to be mounted to the nut member 2. A plurality of return pipes 4 are arranged to the nut member 2 of the number corresponding to the number of the rows of rollers circulating in the return pipes 4. The return pipes 4 serve to connect one and another ends of the loaded roller rolling passage 3 so as to return the roller 6 rolling to the one end of the loaded roller rolling passage 3 to the other end of the loaded roller rolling passage 3 positioned on the succeeding several turns in spiral. Inside the return pipe 4, the roller return passage 5 having square section is formed along the axial direction thereof. Each of the return pipes 4 has a linearly extending central portion 14 and a pair of end portions 15 formed by bending both sides of the central portion 14 by about 90 degrees so as to provide a gate shape as an entire structure. Each end portion 15 has a circular-arc portion 15a having a constant curvature of radius and a linear front end portion 15b extending from the circular-arc portion 15a. As shown in FIG. 9(c), the paired end portions 15b are twisted each other in opposing directions with respect to the axis of the central portion 14, and as shown in FIG. 9(b) and FIG. 10(a), the front end portions 15b are inclined in directions reverse to each other in lead angle directions as viewed from the side of the screw shaft 1. In addition, as shown in FIG. 10(c), in a state viewed from the axial direction of the screw shaft, the front end portions 15b face the tangential direction of the loaded roller rolling passage 3. Further, in a state that the return pipes 4 are mounted to the nut member 2 and the central portions 14 of the return pipes 4 are positioned in the horizontal direction, the front end 28 of each return pipe 4 extends toward a horizontal surface 17 including the axis of the screw shaft 1.

In comparison with a circular roller rolling passage as in a cross roller ring, in the spiral loaded roller rolling passage 3, in order to smoothly circulate the rollers, the attitude of the roller is extremely important at the time when the roller 6 is guided inside the return pipe 4 from the loaded roller rolling passage 3 or when the roller 6 is returned to the loaded roller rolling passage 3 from the inside of the return pipe 4. The roller 6 can be returned smoothly in the loaded roller rolling passage 3 without changing the attitude of the roller 6 entering into the loaded roller rolling passage 3 from the return pipe 4 (that is, without inclining the axis of the roller 6, i.e. causing so-called a skew) by returning the roller 6 to the loaded roller rolling passage 3 from the return pipe 4 with the attitude of the roller 6 being inclined by the amount of the lead angle. In addition, the roller 6 can be smoothly returned inside the return pipe 4 from the loaded roller rolling groove 3.

In order to prevent the return pipe 4 and a screw thread of the screw shaft from interfering, a arch-shaped notch 18 is formed to the front end portion 15b along the central line of a track of the roller 6. The shape of the notch 18 viewed from the direction of the axis of the screw shaft 1 provides a circular-arc shape. Further, inside the notch 18, in a state viewed from the axial direction of the screw shaft 1, a roller guide portion 19 is formed so as to intrude inside the screw thread. The sectional shape of the roller return passage 5 at the position of the roller guide portion 19 is formed to be a rectangular shape, i.e. square shape in this embodiment. By forming the roller guide portion 19, a section at which the roller return passage 5 has the square section is made longer in a plane perpendicular to the axis of the return pipe 4. Because of this reason, a space "h" at which the square roller return passage 5 is not formed can be made smaller, and a continuity, in section, between the loaded roller rolling passage 3 and the roller return passage 5 can be provided. As shown in FIG. 9(b), a front end portion 20 of the roller guide portion 19 provides a linear shape as viewed from the side portion of the screw shaft 1 and is inclined by the amount of the lead angle with respect to the horizontal plane 17. Moreover, in order to make smaller the space "h", the section of the roller guide portion 19 along the axial direction of the return pipe 4 is formed to be tapered so as to gradually narrow towards the front end portion 20 (see FIG. 11).

The roller 6 is guided into the return pipes 4 after the rolling in the loaded roller rolling passage 3 having the square section. When the load is released from the roller moving spirally with the load being received in the loaded roller rolling passage 3, the roller moves naturally in the lead angle direction and tangential direction of the loaded roller rolling passage 3. In the case of the large space "h" mentioned above, there is a fear of causing so-called skew such as engaging with a joining portion between the loaded roller rolling passage 3 and the return pipe 4 or inclining of the axis of the roller 6. The space "h" can be made small by providing the roller guide portion 19, and accordingly, the roller 6 can be moved in the lead angle direction and tangential direction of the loaded roller rolling passage 3. Although the roller 6 can be of course guided to the front end portion 15b in which the notch 18 is formed, the roller 6 can be further stably guided by providing the roller guide portion 19 intruding inside the screw thread.

Figure 11:
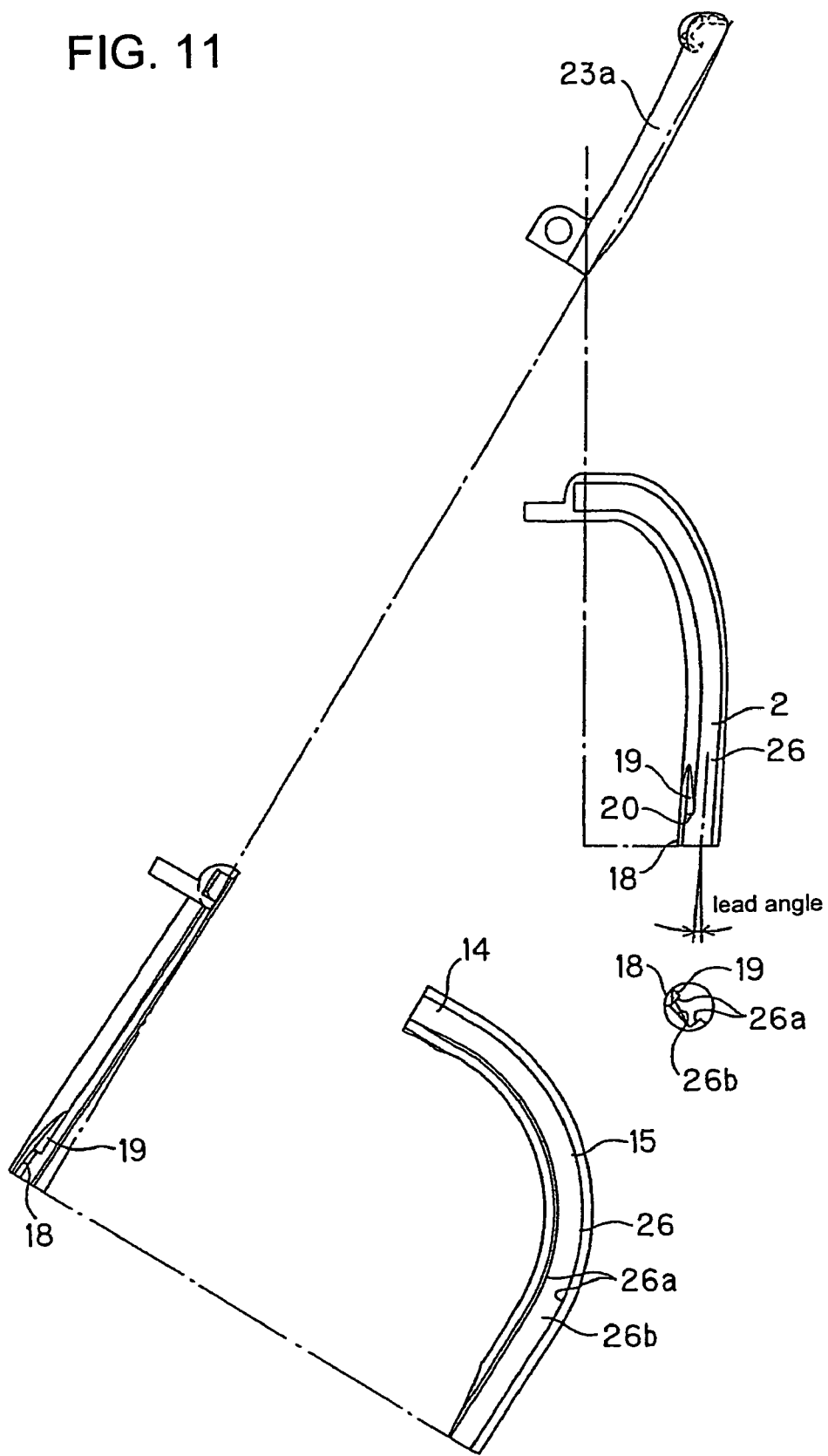
FIG. 11 shows divided pieces (split members) of the return pipe.
Figure 12:
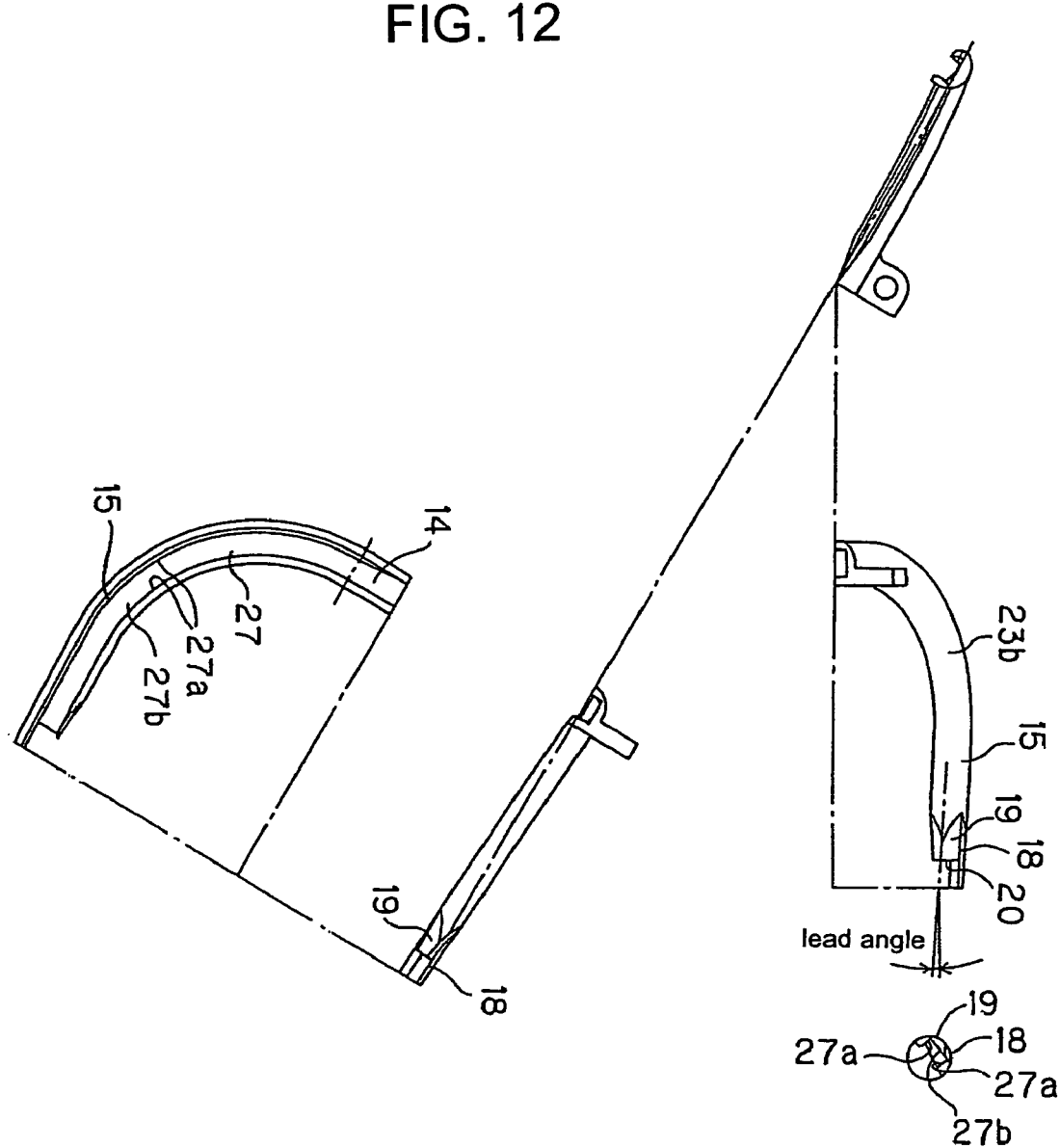
FIG. 12 shows divided pieces of the return pipe.

Further, the return pipes 4 may be manufactured through a cutting working or a resin molding process. FIGS. 9 and 10 represent the examples manufactured through the cutting working, in which the return pipe 4 is divided in the axial direction at the center of the central portion thereof and also divided along the axial direction into, totally, four divided (split) pieces. Divided pieces 23a and 24b shown in FIG. 10(b) have the same shape and divided pieces 23b and 24a have also the same shape. FIG. 11 shows the divided piece 23a and FIG. 12 shows the divided piece 23b. Since the return pipe 4 has a circular outer configuration and the roller return passage 5 has a square shape, if the return pipe 4 is divided at the diagonal positions of the square shape, the thickness of the return pipe 4 is made thin. Because of this reason, the return pipe 4 is divided by the line connecting the central position of one side of the square shape and the central position of another one side opposing to that one side, and the roller guide portion 19 is also divided by this line. Further, in this embodiment, although an example in which the return pipe is divided into four pieces is described, the return pipe 4 may be divided into two pieces in a viewpoint of the reduction of the number of parts or like.

To the respective divided pieces 23a and 23b, there are formed grooves 26 and 27 constituting the roller return passage 5. The grooves 26 and 27 are composed of a pair of wall surfaces 26a and 27a and bottom portions 26b and 27b, respectively. Although the details will be described hereinlater, the grooves 26 and 27 are not twisted at the section of the end portion 15 and their sectional shapes do not change even if the end portion 15 is moved in the axial direction. On the other hand, the grooves 26 and 27 are twisted at the section of the central portion 14 and their sectional shapes change as it moves in the axial direction of the end portion 15. As shown in FIG. 9(c), the attitude of the roller 6 is turned by an angle of $\alpha$ degrees from the end portion 15 to the center in the axial direction of the central portion 14 and is turned by an angle of $\alpha$ from the center in the axial direction of the central portion 14 to the end portion 15. Accordingly, the attitude of the roller scooped up by the end portion 15 of the return pipe 4 as if it accords with the attitude at the center in the axial direction of the central portion 14.

Figure 13:
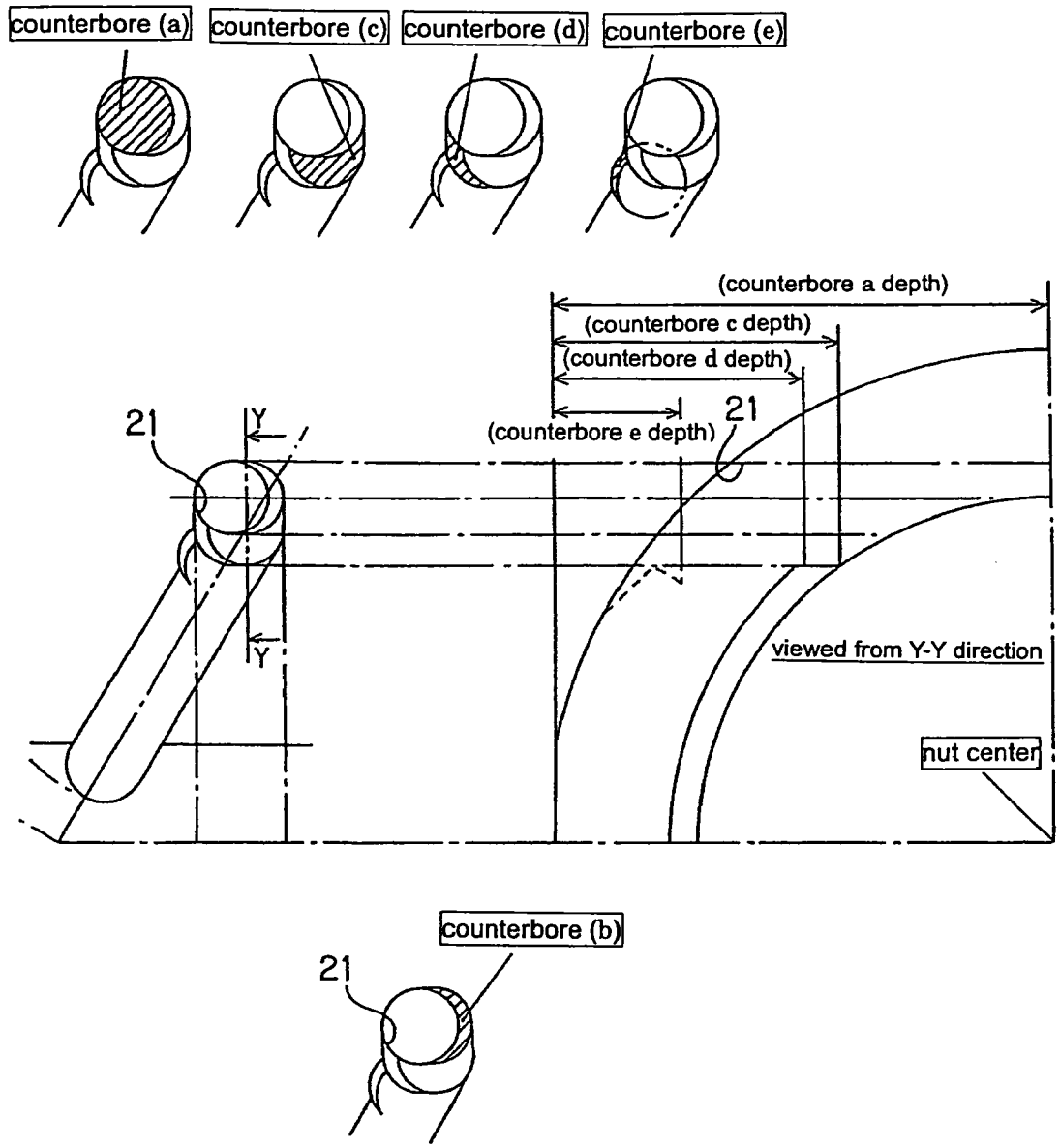
FIG. 13 is a detailed view showing a portion of the nut member to which the return pipe is mounted.

FIG. 13 shows the details of a portion of the nut member 2 to which the return pipe 4 is mounted. The nut member 2 is formed with a plurality of return pipe fitting holes 21 into which end portions 15 of the return pipes 4 are inserted. These fitting holes 21 are formed with an interval of several pitches on both sides of the screw shaft 1 on a plan view and extend to the loaded roller rolling passage 3. The end portions of the return pipes 4 are inserted into the return pipe fitting holes 21. Mount seats are formed to the return pipes 4 and fixed to the nut member 2 by means of bolt or like.

The return pipe fitting holes 21 are formed from a plurality of counterbores. As mentioned above, the end portions 15 of the return pipes 4 are inclined in accordance with the lead angles and directed toward the tangential direction of the loaded roller rolling passage 3. In order to mount the return pipes 4 having such complicated structures, the plural counterbores (a) to (e) are bored to the nut member 2 at positions shifted on the plan view from each other and with different depths from each other. With the roller screw, although the roller return passage 5 has a square section, the return pipe 4 has a circular outer configuration. For this reason, it is necessary to form a large hole to the nut member 2. If a long hole, i.e., a slot, is formed to the nut member 2 so as to penetrate to the loaded roller rolling groove 2a and the return pipe 4 is arranged in the slot, the return pipe may cover, more than necessary, the loaded roller rolling groove 2a of the nut member 2. However, by forming the counterbores, such problem can be overcome.

Figure 14:
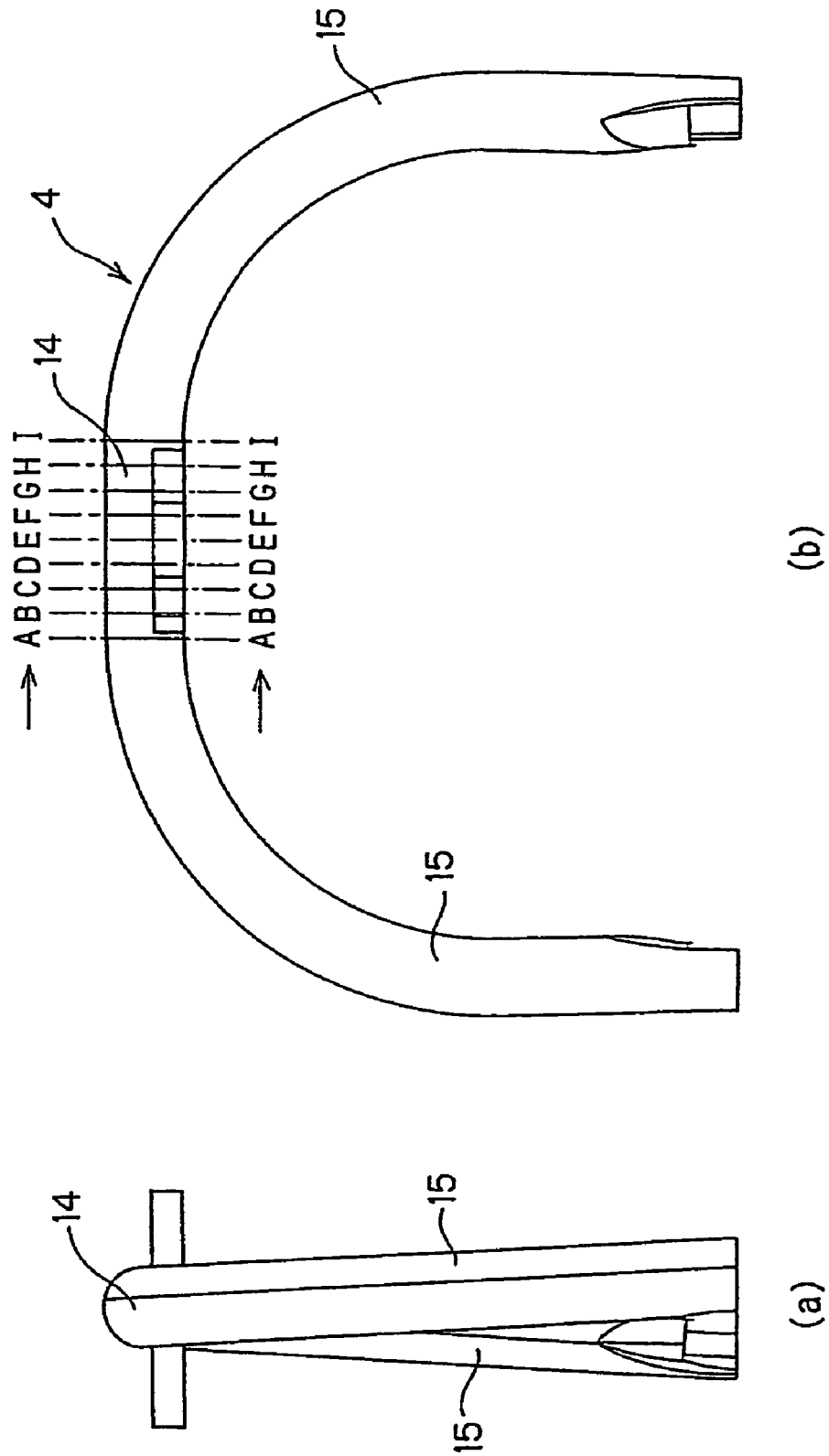
FIG. 14 shows the return pipe.
Figure 15:
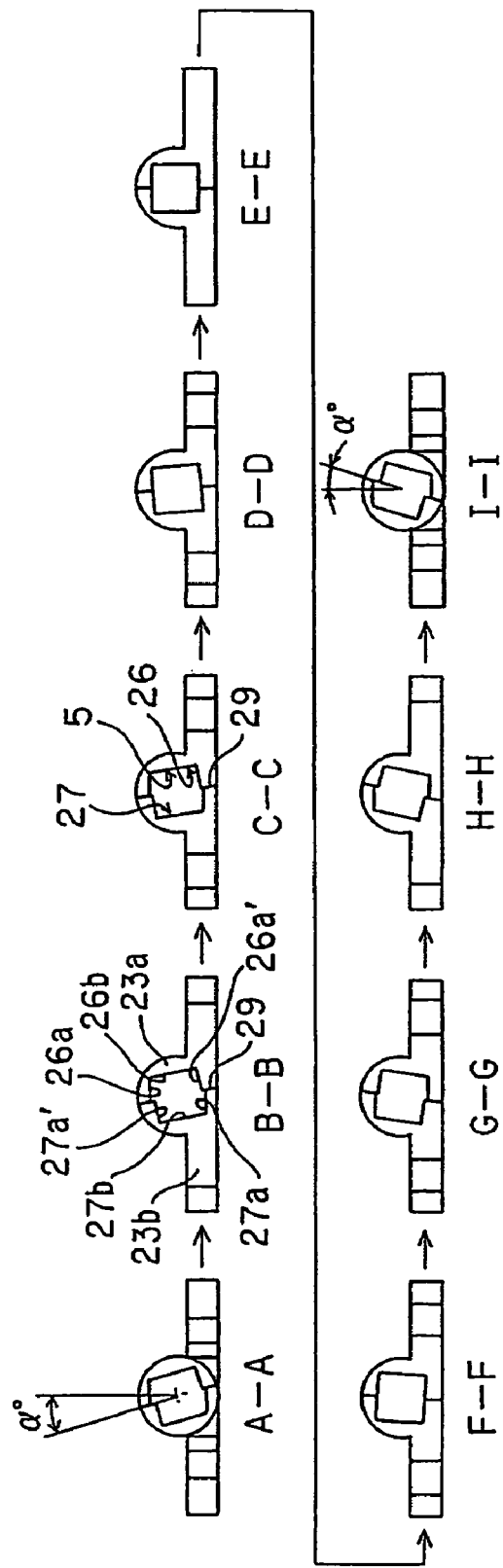
FIG. 15 is a view showing change of a sectional shape of the roller returning passage at a central portion of the return pipe.

FIG. 14 represents the return pipe 4 and FIG. 15 shows a change of the sectional shape of the roller return passage 5 at the central portion 14 of the return pipe 4. The roller return passage 5 at the central portion 14 of the return pipe 4 is twisted such that the attitude of the roller 6 changes in accordance with the movement of the roller 6 in the axial direction of the central portion 14. The roller return passage in the central portion 14 is twisted at an equal angle from the center position E-E in the axial direction of the central portion 14 toward both ends A-A or I-I, and the twisting angle $\alpha$ from the position A-A to the position E-E is equal to the twisting angle $\alpha$ from the position E-E to the position I-I. That is, herein, the roller return passage 5 is twisted so that the attitude of the rollers 6 scooped up at a pair of end portions 15, 15 accord with that at the center position E-E of the central portion 14. Further, the roller return passage 5 may be twisted up to the end portions 15, 15 to take a longer twisting section without limiting to the example in which the roller return passage 5 is twisted at only the central portion 14.

The roller 6 guided into the return pipe 4 moves in the axial direction while maintaining a constant attitude in the end portion. When the roller is guided in the central portion 14, the roller 6 moves in the axial direction from the position A-A to the position I-I while, for example, rotating clockwisely. When the roller 6 moves to the other end portion 15, the roller 6 moves in the axial direction while maintaining the constant attitude in the end portion 15. Thereafter, the roller returns to the loaded roller rolling passage 3.

The divided pieces 23a and 23b are provided with the grooves 26 and 27, respectively, constituting the roller return passage 5. In the section in which the roller return passage 5 at the central portion 14 twisted, one wall surface 26a of the groove 26 is inclined with respect to another wall surface 26a', and the roller 6 is guided between a wall surface 26a' of one of the divided pieces 23a (surface perpendicular to the divided surface 29) and a wall surface 27a' of the other divided piece 23b (surface perpendicular to the divided surface 29). This is done in consideration of easy rapping operation, i.e., no-causing of undercut in the case that the return pipe 4 is formed through a resin molding process. Even in such structure, the attitude of the roller is surely prescribed between the one wall surface 26a' and the other wall surface 27a'. Further, although the divided surfaces 29 of the divided pieces 23a and 23b are twisted in conformity with the twisting of the roller return passage 5, there is a case of no-twisting in consideration of easiness of the resin molding.

Figure 16:
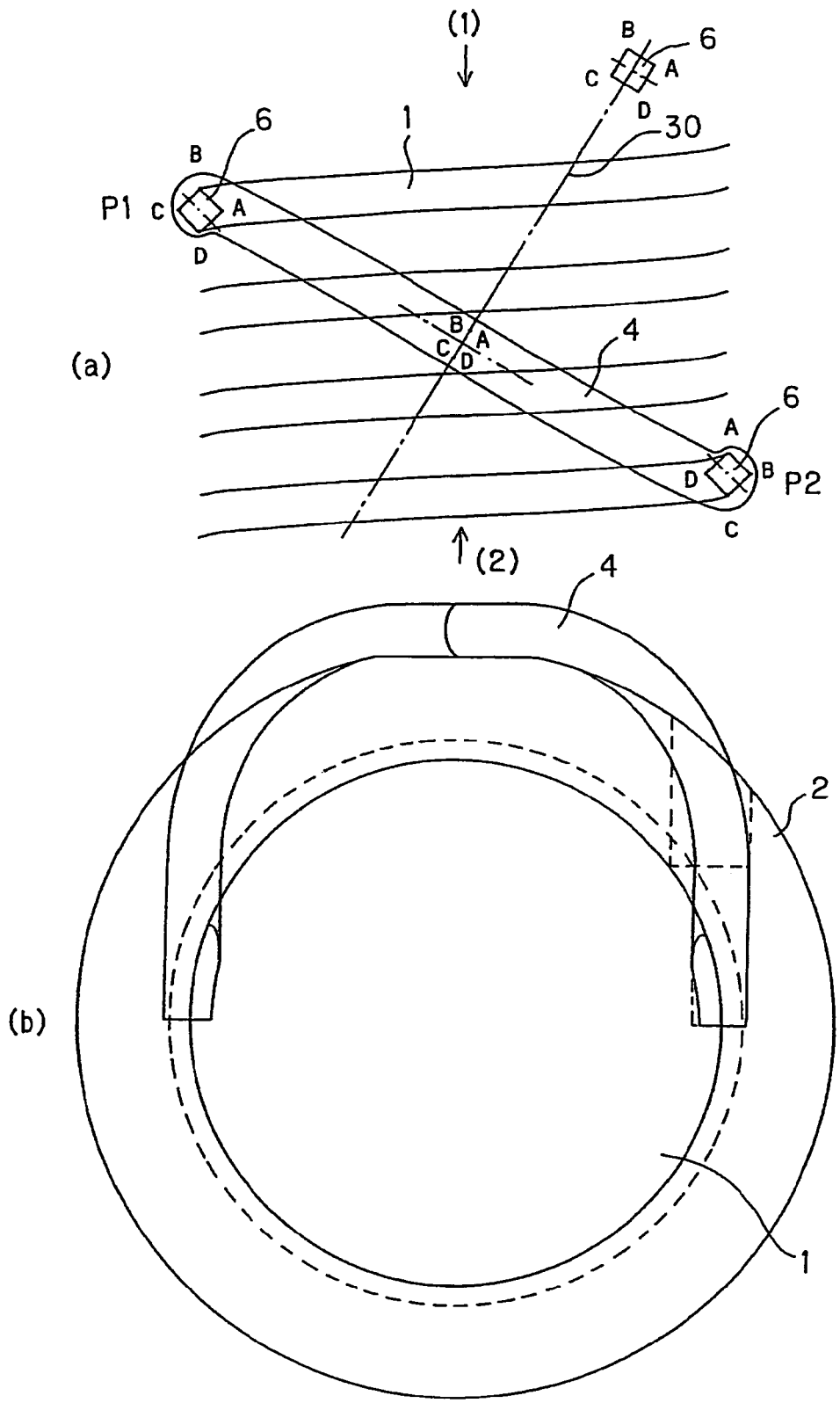
FIG. 16 is a view showing a change of an attitude of the roller.

FIG. 16 shows a change in attitude of the roller 6. In FIG. 16, (a) shows a plan view and (b) shows a view from the axial direction of the screw shaft 1. The roller 6 is returned from one end of one turn of the loaded roller rolling passage 3 to the other end on the succeeding several turns on this side. In order to make minimal an angle for turning the attitude of the roller 6 in the roller return passage 5, the roller 6 is half reversed by passing the return pipe 4. More specifically, the side AB of the roller 6 positioned on the one end P1 in FIG. 16 rolls on the roller rolling groove 1a of the screw shaft 1 and the side CD of the roller 6 rolls on the loaded roller rolling groove 2a of the nut member 2, thereby bearing the load in the axial direction (1). When the roller passes the return pipe 4 and moves to the other end P2, the roller is reversed around a line 30 perpendicular to the return pipe 4. Then, the side CD of the roller 6 rolls on the roller rolling groove 1a of the screw shaft 1 and the side AB of the roller 6 rolls on the loaded roller rolling groove 2a of the nut member 2, thereby bearing the load in the direction (2). As mentioned above, by reversely turning the roller 6, the twisting angle of the roller return passage 5 can be made minimal. Although it is possible not to reversely turn the roller, in such case, it is necessary to turn the attitude of the roller by the angles of 45 or 90 degrees in the return pipe 4.

FIG. 17 shows a spacer 31 interposed between the rollers 6. The spacer 31 has both ends in which concave (recessed) portions 31a, 31a are formed so as to provide a curved surface in conformity with the outer peripheral surface of the adjacent rollers 6 to slidably contact the outer peripheral surface of the rollers 6. The curved concave portions 31a, 31a are formed so that the rollers 6 can be disposed in cross arrangement, and the radius of curvature of the curved concave is set to be slightly larger than the radius of the roller 6. If a corner portion 31a of the spacer 31 has a sharp shape, there is a fear that the spacer is jammed with the joining portion between the loaded roller rolling passage 3 and the return pipe 4. Because of this reason, the corner portion 31a of the spacer 31 is chamfered.

Figure 20:
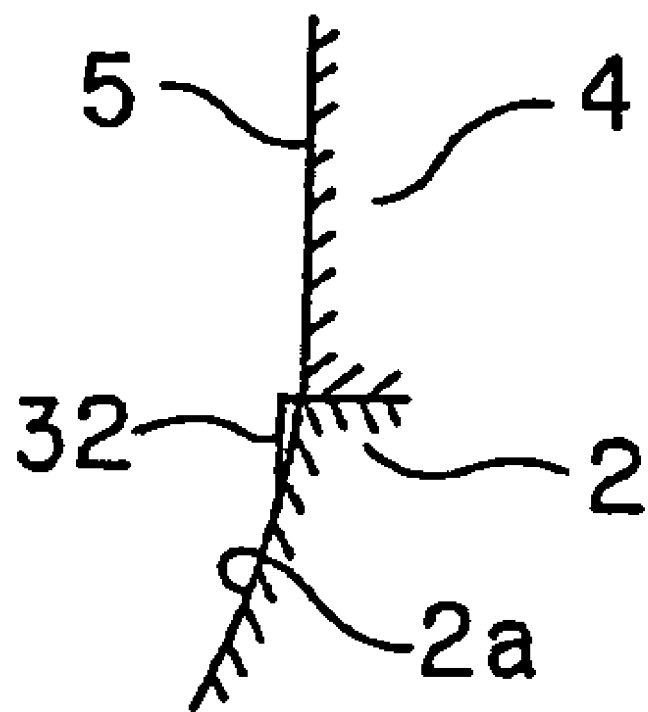
FIG. 20 is a sectional view showing the joining portion between the loaded roller rolling groove and the return pipe.

FIG. 18 shows the joining portion between the loaded roller rolling passage 3 and the return pipe 4, and FIG. 19 shows a detailed view of the portion A in FIG. 18 (a view comparing a sectional shape of an entrance portion of the roller rolling groove of the nut member with a sectional shape of an entrance of the return pipe). The sectional shape of the roller return passage 5 at the entrance of the return pipe 4 is slightly larger than the sectional shape of the loaded roller rolling groove 2a of the nut member 2. Because of this reason, a small step, i.e., difference in stage, at the joining portion between the loaded roller rolling groove 2a of the of the nut member 2 and the roller return passage 5 of the return pipe 4 is formed. However, as the loaded roller rolling groove 2a of the nut member 2 and the roller return passage 5 of the return pipe 4 have similar figures having V-shaped sections with opening angles of 90 degrees, as shown in FIG. 20, by crowning (cutting obliquely) a portion 32, near the return pipe 4, of the loaded roller rolling groove 2a of the nut member 2, the shapes of the loaded roller rolling groove 2a of the nut member 2 and the roller return passage 5 of the return pipe 4 can be made coincident with each other, and thereby no step is formed to the joining portion and the roller 6 can hence smoothly circulate. In addition, a stress applied at a time when the roller enters into the loaded roller rolling groove 2a from the return pipe 4 can be relaxed.

Further, it is to be noted that the embodiments of the present invention may be changed variously without departing from the subject features of the present invention. For example, in the embodiment described above, the nut member 2 is constructed by combining two split (divided) nut pieces in order to increase an allowable load in the axial direction, but it may be composed of a single nut member. Moreover, a roller having a dimension smaller than a prescribed value may be used and a pre-load is applied thereto by means of shim. In addition, the circulation member is not limited to the return pipe as far as the roller return passage can be formed, and for example, the circulation member may be composed of a linear roller scoop-up portion communicated with both ends of the roller rolling groove of the nut member and a roller circulation portion communicated with this roller scoop-up portion. The roller circulation portion is constructed by assembling a return plate formed with a circulation groove having a V-shaped section to an outer peripheral portion of the nut member to which a circulation groove having a V-shaped section is formed.

The invention claimed is:

1. A roller screw comprising a screw shaft having an outer peripheral surface in which a spiral roller rolling groove is formed, a nut member having an inner peripheral surface in which a spiral loaded roller rolling groove is formed so as to oppose to the roller rolling groove of the screw shaft, a circulation member in which a roller return passage connected to the loaded roller rolling passage is formed so that rollers rolling in the loaded roller rolling passage between the roller rolling groove of the screw shaft and the loaded roller rolling groove of the nut member circulate, and a number of rollers disposed in the loaded roller rolling passage and the roller return passage, wherein the circulation member has a front end portion in which a notch is formed so as to prevent the circulation member from contacting to a screw thread of the screw shaft, a roller guide portion is formed inside the notch so as to intrude inside the screw thread as viewed from the axial direction of the screw shaft, wherein the roller guide portion extends in an axial direction of the front end portion, the roller guide portion has a base portion and a front end, the front end extending toward and being spaced from one end of the front end portion in the axial direction of the front end portion, the base portion is connected to the front end portion, and the roller return passage has a rectangular cross-section at a position of the front end of the roller guide portion, wherein the front end portion of the circulation member is disposed in a tangential direction of the loaded roller rolling passage as viewed from the axial direction of the screw shaft and inclined in a lead angle direction of the loaded roller rolling passage as viewed from the side of the screw shaft, and wherein the front end of the roller guide portion provides a linear shape as viewed from the side portion of the screw shaft and is inclined by the amount of the lead angle with respect to the horizontal plane.

2. The roller screw according to claim 1, wherein the roller guide portion along the axial direction of the roller return passage has a sectional shape tapered so as to be gradually reduced in a width toward the front end of the roller guide portion.

3. The roller screw according to claim 1, wherein the circulation member has the front end portion at which the roller return passage having a rectangular cross-section corresponding to a side surface shape of the roller is formed, and the loaded roller rolling groove of the nut member is formed so that a shape of the loaded roller rolling groove of the nut member and a shape of the roller return passage at the front end portion accord with each other at the joining portion between the loaded roller rolling passage and the front end portion of the circulation member.

* * * * *